United States Patent
Elges et al.

(10) Patent No.: US 11,334,472 B2
(45) Date of Patent: May 17, 2022

(54) AUTOMATED TESTING FOR METADATA-DRIVEN CUSTOM APPLICATIONS

(71) Applicant: NextWorld LLC, Denver, CO (US)

(72) Inventors: Michael Elges, Littleton, CO (US); Alec P. Ruth, Parker, CO (US); Reece M. Hughes, Centennial, CO (US)

(73) Assignee: Nextworld, LLC, Greenwood Village, CO (US)

( * ) Notice: Subject to any disclaimer, the term of this patent is extended or adjusted under 35 U.S.C. 154(b) by 0 days.

(21) Appl. No.: 16/706,005

(22) Filed: Dec. 6, 2019

(65) Prior Publication Data

US 2020/0192790 A1 Jun. 18, 2020

Related U.S. Application Data

(60) Provisional application No. 62/779,656, filed on Dec. 14, 2018.

(51) Int. Cl.
*G06F 11/36* (2006.01)

(52) U.S. Cl.
CPC ...... *G06F 11/3688* (2013.01); *G06F 11/3664* (2013.01); *G06F 11/3692* (2013.01)

(58) Field of Classification Search
CPC ............ G06F 11/3664; G06F 11/3688; G06F 11/3684; G06F 11/368; G06F 8/34
See application file for complete search history.

(56) References Cited

U.S. PATENT DOCUMENTS

| | | | | |
|---|---|---|---|---|
| 8,620,777 | B2 * | 12/2013 | Brass | G06Q 40/02 705/30 |
| 2001/0032207 | A1 * | 10/2001 | Hartley | G06Q 30/06 |
| 2005/0154742 | A1 | 7/2005 | Roth et al. | |
| 2005/0166094 | A1 | 7/2005 | Blackwell et al. | |
| 2005/0188357 | A1 | 8/2005 | Derks et al. | |
| 2010/0169867 | A1 * | 7/2010 | Wegmann | G06F 11/3664 717/129 |
| 2016/0203072 | A1 | 7/2016 | Boxall et al. | |
| 2018/0052861 | A1 * | 2/2018 | Seetharaman | G06F 16/254 |
| 2019/0087075 | A1 * | 3/2019 | Dhayanithi | G06F 3/04842 |
| 2020/0125483 | A1 * | 4/2020 | Lipke | G06F 11/3692 |

* cited by examiner

*Primary Examiner* — Duy Khuong T Nguyen

(57) ABSTRACT

In non-limiting examples of the present disclosure, systems, methods and devices for assisting with testing custom application software are provided. An input that modifies an application action may be received. A request to execute a test action corresponding to the application may be received. One or more test steps for executing the test action may be identified. Each of the one or more test steps may be executed in a test framework utilizing test metadata. A determination may be made as to whether an unexpected result occurred during the execution of the one or more steps. If an unexpected result is determined to have occurred, a graphical representation of the unexpected result may be caused to be displayed.

20 Claims, 8 Drawing Sheets

AUTOMATED TESTING FOR METADATA-DRIVEN CUSTOM APPLICATIONS

CROSS-REFERENCE TO RELATED APPLICATIONS

The present application claims priority to U.S. Provisional Application No. 62/779,656 filed Dec. 14, 2018 titled "Automated Testing for Metadata-Driven Custom Applications" which is incorporated herein by reference in its entirety for all purposes.

BACKGROUND

Enterprise resource planning (ERP) software provides mechanisms for company personnel to plan and manage various resources associated with the company's business from one or more applications. Aspects of a business that can be tracked or otherwise managed utilizing ERP software include sales management, production planning, manufacturing or service delivery, marketing, materials management, inventory management, retail, shipping and payment, and financials. Although ERP software can be tailored to a company based on a particular application or application suite that the company utilizes, the specific mechanics included in such applications or application suites may include superfluous features and/or there may be certain features that company personnel would like, but which nonetheless do not exist in current software packages. That is, a one size fits all solution in ERP software is difficult to apply because the wants and needs of each company are different, and those wants and needs are often in flux due to a variety of factors.

While custom ERP software may fill some of the needs described above, the cost involved with designing custom software is often prohibitive. Additionally, where an ERP software development company may have many different custom software clients, it is difficult and time consuming to upgrade and/or fix software elements that may be common amongst each client.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for testing custom application software utilizing a no-code enterprise resource planning (ERP) test application. A testing user may identify a step and/or an action in an ERP application that the user would like to add, modify, and/or delete, and the user may select that step and/or action via a test application user interface. The test application user interface may display a plurality of steps and/or actions associated with the ERP application that may be added, modified and/or deleted from the ERP application and tested by the test application prior to rolling the modified software out in the actual application. If the user selects a test step and/or action to modify or add in the existing ERP application, the user may select where in a test action flow the test step and/or action should be executed.

In some examples, the test application may identify metadata chunks from one or more metadata stores (e.g., base metadata store, tenant metadata store, lifecycle metadata store) corresponding to the test action flow to be tested, and the test application may create a test framework from test metadata for executing steps associated with the test action flow. The test application may also identify what application elements are expected to be affected, and in what manner, by the modification to the ERP application, and when the test application executes each of the steps in the test action flow, it can then determine whether any unexpected results occurred. In some examples, the expected effects information may be stored directly in the base metadata, tenant metadata, and/or lifecycle metadata. In other examples the expected effects information may be stored in an index associated with the metadata, the test application, and/or an ERP application service. Additionally, once the test application has executed steps and/or actions in a test action flow, the test application may highlight or otherwise indicate any unexpected results to the testing user.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
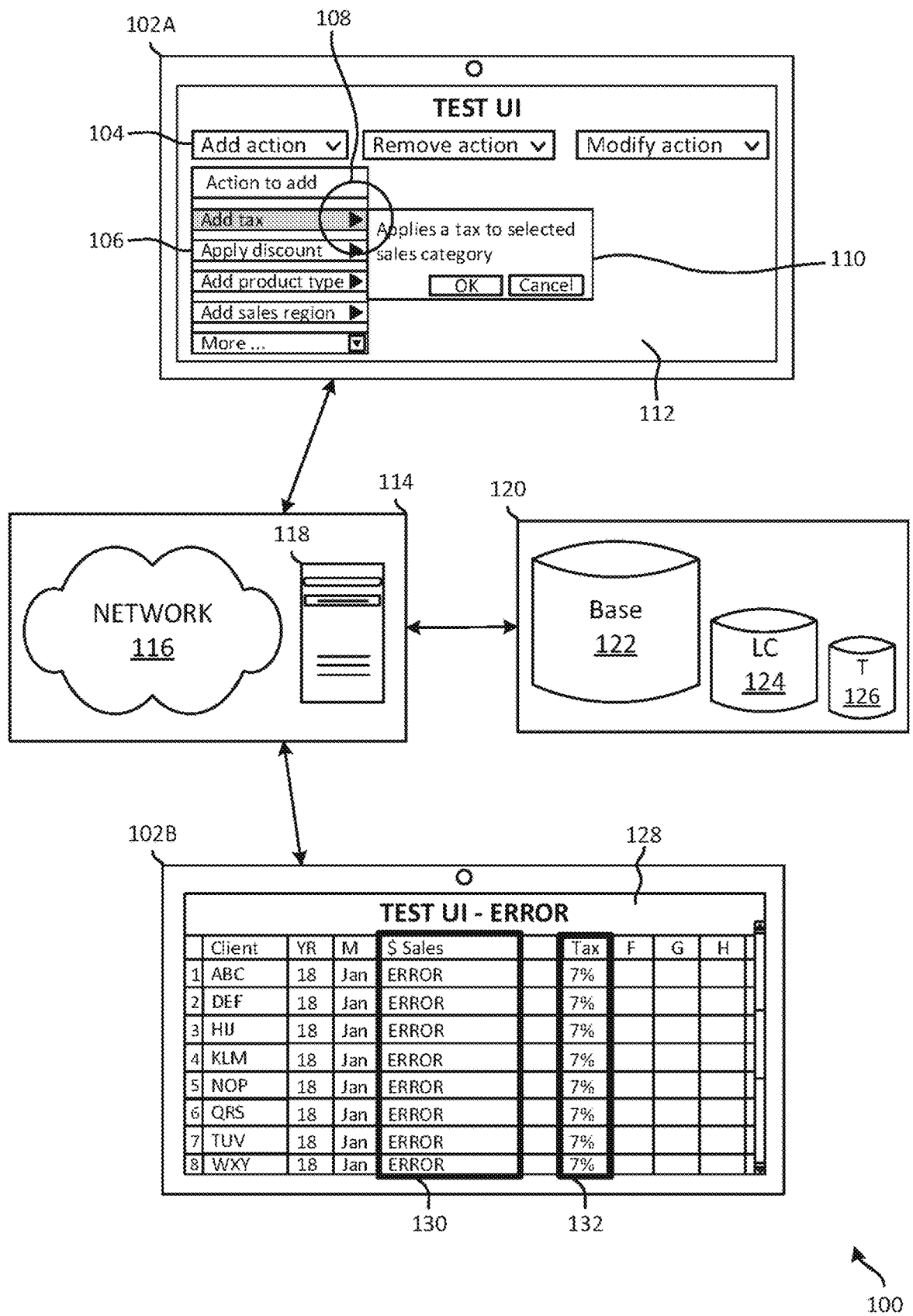
FIG. 1 is an exemplary distributed computing architecture for testing custom application software utilizing a no-code consumer platform in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments will be described in detail with reference to the drawings wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. The various embodiments and examples described herein are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for testing custom application software. In an example, a method is provided, the method comprising: receiving an input that modifies a step associated with an application action; receiving a request to execute a test action corresponding to the application action; identifying one or more test steps for executing the test action; executing each of the one or more test steps in a test framework utilizing test metadata; determining whether an unexpected result occurred during the execution of the one or more steps; and causing, if an unexpected result is determined to have occurred, a graphical representation of the unexpected result to be displayed.

In another example, a system for testing custom application software is provided. The system may comprise: at least one processor; and a memory operatively connected to the at least one processor, the memory comprising computer-executable instructions that, when executed by the at least one processor, are operative to: receive an input that adds at least one step associated with an application action; receive a request to execute a test action corresponding to the application action; identify one or more test steps for executing the test action; execute each of the one or more test steps in a test framework utilizing test metadata; determine whether an unexpected result occurred during the execution of the one or more steps; and cause, if an unexpected result is determined to have occurred, a graphical representation of the unexpected result to be displayed.

In still another example, a computer-readable storage device is provided. The computer-readable storage device may comprise executable instructions that, when executed by one or more processors, assist with testing custom application software, the computer-readable storage device including instructions executable by the one or more processors for: receiving an input that modifies an application action; receiving a request to execute a test action corresponding to the application action; identifying one or more test steps for executing the test action; executing each of the one or more test steps in a test framework utilizing test metadata; determining whether an unexpected result occurred during the execution of the one or more steps; and causing, if an unexpected result is determined to have occurred, a graphical representation of the unexpected result to be displayed.

The systems, methods, and devices described herein provide technical advantages for efficiently testing software that is customized by end users. Allowing end users rather than developers to customize their own enterprise resource planning (ERP) software applications provides a high degree of flexibility on the consumer side, but is typically too cost-intensive from a developer standpoint due to the necessity of having the developer modify and test any desired modifications to the software. Utilizing the mechanisms described herein, users can customize their ERP software applications by modifying chunks of base, tenant, and lifecycle metadata, and test those modifications using a no-code testing environment that allows users to quickly see whether the modifications they would like to make are workable, or if they produce unexpected errors, and different modifications should be made. Users of the no-code testing environment do not have to have any coding experience and can easily test modifications to existing ERP applications via the no-code test framework. The ability of the consuming users to modify and test their own software in a no-code environment reduces processing costs (i.e., computer processing unit (CPU) cycles) and storage costs that would otherwise be required for those consuming users to write their own code to modify the applications rather than having the software distributors test that code and produce individualized updates for that code at the distributor level for every modifying consumer.

FIG. 1 is an exemplary distributed computing architecture 100 for testing custom application software utilizing a no-code consumer platform. Computing architecture 100 comprises computing device 102A, which is displaying a test application user interface 112 for no-code testing of custom ERP applications, metadata storage sub-environment 120, network and processing sub-environment 114, and computing device 102B, which is displaying error user interface 128 for highlighting errors detected with relation to corresponding custom ERP application modifications. Computing device 102A and computing device 102B may be the same computing device or different computing devices, and any of the computing devices depicted in FIG. 1 may communicate with one another and with other computing devices (e.g., one or more computing devices shown in FIG. 5) via network 116.

The test application user interface 112 displayed on computing device 102A comprises no-code elements for modifying an existing ERP application framework, and testing elements of the ERP application framework that correspond to the modification. In some examples, the test application and its corresponding test application user interface 112 may be utilized to add, remove, and/or modify actions and various elements in an ERP application. For example, a user may utilize the test application and its corresponding test application user interface 112 to add journal entries, modify display objects, edit table value, modify calculations, and add, modify or delete other ERP application elements. In other examples, the test application and its corresponding test application user interface 112 may be utilized to add, remove, and/or modify individual steps that makeup actions in an ERP application (e.g., create item, set values for all the data items, and save action, for an add journal entry example). In some examples, when a user selects a new step to add to an existing action or set of steps, the user may select where to input the new step in the series of steps that makeup a corresponding action. While the test application user interface 112 illustrates one example of no-code user interface elements that may be interacted with to modify an ERP application framework for testing, other user interface configurations are contemplated according to this disclosure.

Metadata storage sub-environment 120 includes base metadata storage 122, lifecycle metadata storage 124, and tenant metadata storage 126. One or more metadata chunks in tenant metadata storage 126 may comprise information that may be utilized to provide a customized user interface and/or user experience element associated with an ERP application to a user associated with a particular tenancy credential. In some examples, one or more metadata chunks in tenant metadata storage 126 may comprise information that may be utilized to provide a customized workflow and/or customized workflow elements for one or more ERP applications. Likewise, one or more metadata chunks in lifecycle metadata storage 124 may comprise information that may be utilized to provide a customized user interface and/or user experience element associated with an ERP application to a user associated with a lifecycle credential. In some examples, one or more metadata chunks in lifecycle metadata storage 124 may comprise information that may be utilized to provide a customized workflow and/or customized workflow elements for one or more ERP applications. According to examples, base metadata storage 122 may include metadata chunks for providing non-customized user interface and/or user experience elements for an ERP application. That is, while lifecycle metadata storage 124 and tenant metadata storage 126 include metadata chunks for one or more customized elements of an ERP application, base metadata storage 122 includes metadata chunks which can be utilized to generate the entirety of an ERP application, in a non-customized manner. Furthermore, metadata chunks from base metadata storage 122 may be combined with metadata chunks from one or both of tenant metadata storage 126 and/or lifecycle metadata storage 124 to provide a semi-customized application experience.

In some examples, users may modify one or more base metadata elements when customized application elements are created via tenant metadata and/or lifecycle metadata in relation to the creation and/or modification of customized ERP applications. One or more metadata chunks may be utilized by an ERP test application to generate test frameworks for testing modifications to existing ERP applications. According to some aspects, a change handling engine associated with network and processing sub-environment 114 may limit one or more elements associated with base metadata that can be modified by users. For example, the change handling engine may disallow users from making customized changes to one or more applications that would cause one or more application elements to function improperly and/or hinder administrative updating of base metadata and its subsequent use in combination with tenant metadata and/or lifecycle metadata.

According to some examples, each metadata chunk in each of tenant metadata storage 126, lifecycle metadata storage 124, and base metadata storage 122 may include a description of each other metadata chunk that it affects and/or each metadata chunk that affects it. In other examples, a separate index comprising that information may be associated with metadata storage sub-environment 120 and/or a custom ERP application service associated with network and processing sub-environment 114. Thus, if a modification is made to one chunk of metadata, the effects of that modification on other metadata chunks may be determined from analyzing the index and/or the descriptions included in the corresponding metadata stores.

A user may wish to test modifications to an ERP application that the user has made prior to fully implementing those modifications in a full version of the ERP application. For example, even if a user may know the expected effects of modifying one or more metadata chunks corresponding to a modification, addition, and/or deletion of an action or action step because that information is associated in an index and/or with the metadata itself, unexpected results may nonetheless occur when certain ERP application modifications are implemented. When a user would like to test a modification to an ERP application prior to rolling it out to the full version of the application, the user may utilize the test application described herein.

In the specific example shown regarding FIG. 1, a user has opened the no-code test application, selected the "add tax" user interface element 108, and confirmed that selection via fly-out window 110. According to some examples, the user may have interacted with a specific column in the ERP application that the user would like to add the tax too, and the "add tax" user interface element 108 may have then been presented to the user. Once the user affirmatively selects to add the tax in the test application, the test application, which may reside on computing device 102A/102B and/or all or in part on server computing device 118 (e.g., in a cloud-based ERP application service), the test application may identify the metadata chunks in metadata storage sub-environment 120 corresponding to the add tax modification, generate a test version of the ERP application for implementing the newly added tax from corresponding metadata chunks in metadata storage sub-environment 120, and determine, based on expected effects of the new tax identified from an index or the metadata itself, whether adding the tax to the ERP application produces expected or unexpected results. In this example, the values in the sales column of the ERP application were affected in a manner that was not expected, and the test application may thus indicate via error user interface 128, the fields/application elements where the unexpected results occurred. In this example, sales column 130 has been highlighted by the test application as including unexpected results, and newly added tax column 132 has also been highlighted by the test application, thereby indicating the reason for the unexpected results in sales column 130.

In this example, object values (i.e., the sales values) in the ERP application are the application elements to which unexpected results have occurred due to the application modification, and they are therefore highlighted in error user interface 128. Other ERP application elements (e.g., display objects, table elements, user experience elements) may be affected in other manners by modifications to certain metadata chunks (e.g., via modifying, adding, or deleting steps or actions in an ERP application). If one of those application elements is unexpectedly impacted by a modification to an ERP application, the error user interface 128 may similarly highlight a corresponding error when the test flow corresponding to those elements is executed. In examples where there are no unexpected application elements that are impacted by a modification to one or more chunks of metadata, the test application may indicate that result to a user after the corresponding test metadata has been tested by the test application.

Figure 2:
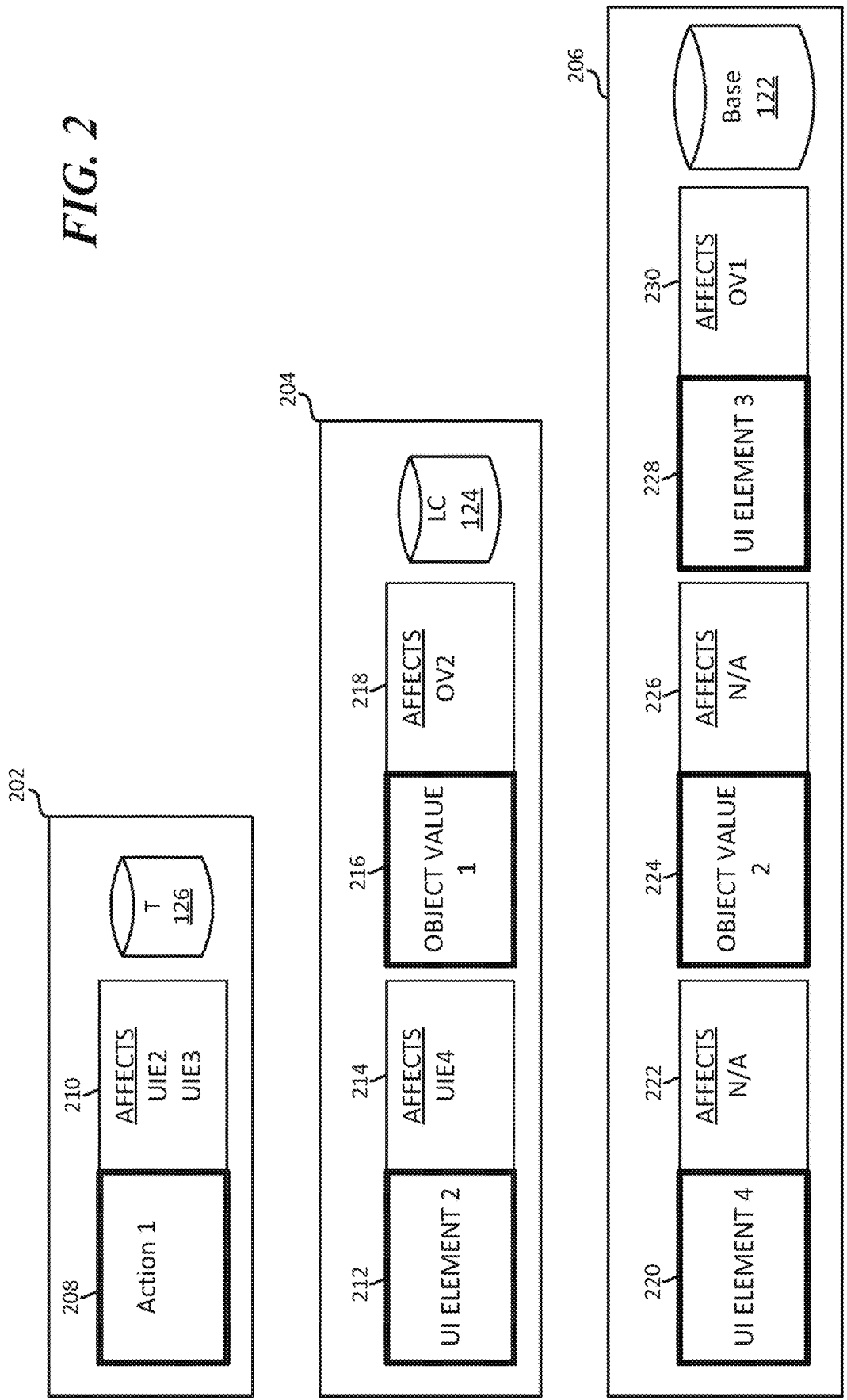
FIG. 2 illustrates information contained in metadata and/or an index associated with a test application service, which describes the effects that each enterprise resource planning (ERP) application element has on each other ERP application element through three layers of the metadata in accordance with some embodiments of the present technology.

FIG. 2 illustrates information contained in metadata and/or an index associated with a test application service, which describes the effects that each ERP application element has on each other ERP application element through three layers of metadata. The metadata chunks shown in relation to each of: base metadata storage 122 in base layer 206, lifecycle metadata storage 124 in lifecycle layer 204, and tenant metadata storage 126 in tenant layer 202, as well as the ERP application elements and their expected effects, are provided for exemplary purposes only. Other application steps, actions, objects, and their corresponding effects may be included with corresponding metadata and/or an index associated with an ERP application service.

When a user utilizes a no-code ERP test application to add an application element, modify an application element, and/or delete an application element, the test application may identify each metadata chunk corresponding to the modifications, and replicate the necessary metadata chunks for running a test scenario through the modified application elements. In running the test scenario through the modified application elements, the test application can analyze, via metadata chunks and/or an index, each step and/or action associated with the modification and identify all of the expected results related to the modification. If an unexpected result is identified by the test application after running the test, the test application can provide an indication to the testing user of what the unexpected result was, as well as an indication of what caused it.

In this specific example, a user may have modified, added, or deleted "action 1" 208, corresponding to one or more metadata chunks in tenant layer 202. In some examples, each of the metadata chunks corresponding to "action 1" 208 in tenant metadata storage 126 may include information 210 about each other chunk of metadata that the "action 1" 208 metadata chunks affect. In other examples, a separate index comprised of effects that each metadata chunk has in relation to each other metadata chunk may be associated with an ERP application service.

In this example, in tenant layer 202, information 210 indicates that "action 1" 208 affects "user interface element 2" 212 and "user interface element 3" 228 in the ERP application. Lifecycle layer 204 includes metadata chunks that are also affected in some manner by the modification to "action 1" 208. Specifically, information 214 associated with metadata chunks corresponding to "user interface element 2" 212 indicates that "user interface element 2" 212 affects metadata chunks corresponding to "user interface element 4" 220; and information 218 associated with metadata chunks corresponding to "object value 1" 216 indicates that "object value 1" 216 affects metadata chunks corresponding to "object value 2" (not shown). Base layer 206 includes metadata chunks that are also affected in some manner by the modification to "action 1" 208. Specifically, although information 222 associated with metadata chunks corresponding to "user interface element 4" 220 indicates that "user interface element 4" 220 does not affect any other object values, user interface elements, and/or user experience elements in the ERP application; and information 226 associated with metadata chunks corresponding to "object value 2" 224 indicates that "object value 2" 224 similarly does not affect any other object values, user interface elements, and/or user experience elements in the ERP application; information 230 associated with metadata chunks corresponding to "user interface element 3" 228 indicates that "user interface element 3" 228 affects metadata chunks corresponding to "object value 1" 216 in lifecycle layer 204.

When the ERP test application executes one or more steps associated with modifications to the existing ERP application (e.g., a modification to "action 1" 208) it can determine what the actual results were via its execution in test metadata, compared with the results it expects based on information 210, 214, 218, 222, 226, and 230.

Figure 3:
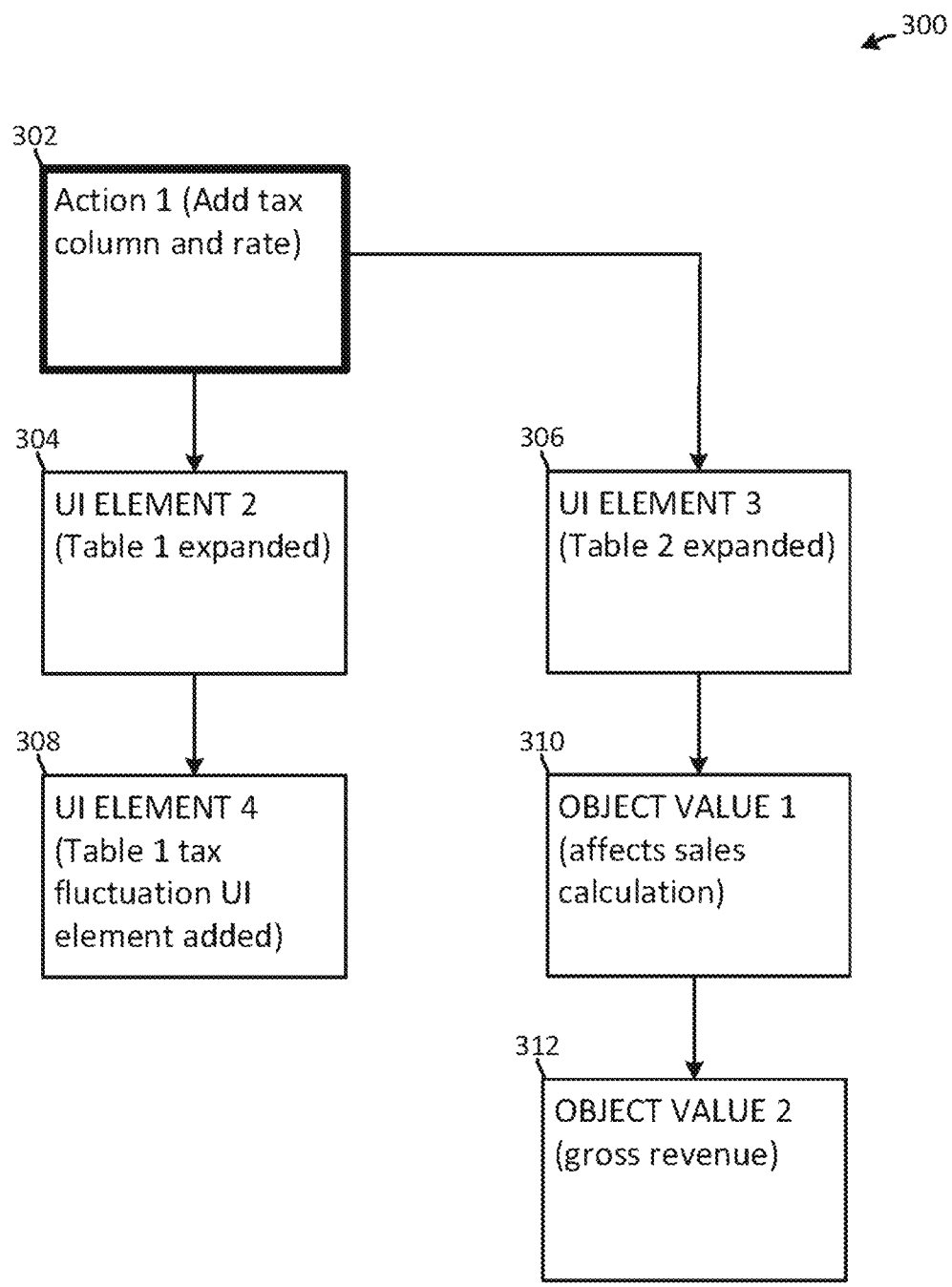
FIG. 3 illustrates one exemplary mechanism described in test metadata by which modifying a single ERP application action can affect various other ERP application elements in accordance with some embodiments of the present technology.

FIG. 3 illustrates one exemplary mechanism 300 described in test metadata by which modifying a single ERP application action can affect various other ERP application elements. Although the effects of adding an entire application action are shown for illustrative purposes, steps within application actions may similarly be mapped to effects in metadata and/or an index that may be utilized in identifying expected and unexpected results of modifying those application steps via an ERP test application.

In this example, a user has utilized an ERP test application to add "tax action" 302 to an existing ERP application. The test application may reference an index or information associated with "tax action" 302 and its corresponding metadata chunks to determine whether unexpected results occur when the tax action is added to the ERP application. In this example, the index and/or information associated with "tax action" 302 metadata chunks, indicates that adding "tax action" 302 to the ERP application is expected to affect "user interface element 2" 304 (i.e., table 1 is expected to be expanded), and that the subsequent modification of "user interface element 2" 304 is expected to affect "user interface element 4" (i.e., table 1 is expected to have a tax fluctuation user interface element added to it). Adding "tax action 302" to the ERP application is also expected to affect "user interface element 3" 306 (i.e., table 2 is expected to be expanded), the modification of "user interface element 3" 306 is expected to affect "object value 1" 310 (i.e., sales values are expected to be modified), and the modification of "object value 1" 310 is expected to affect "object value 2" 312 (i.e., gross revenue value is expected to be modified).

Figure 4:
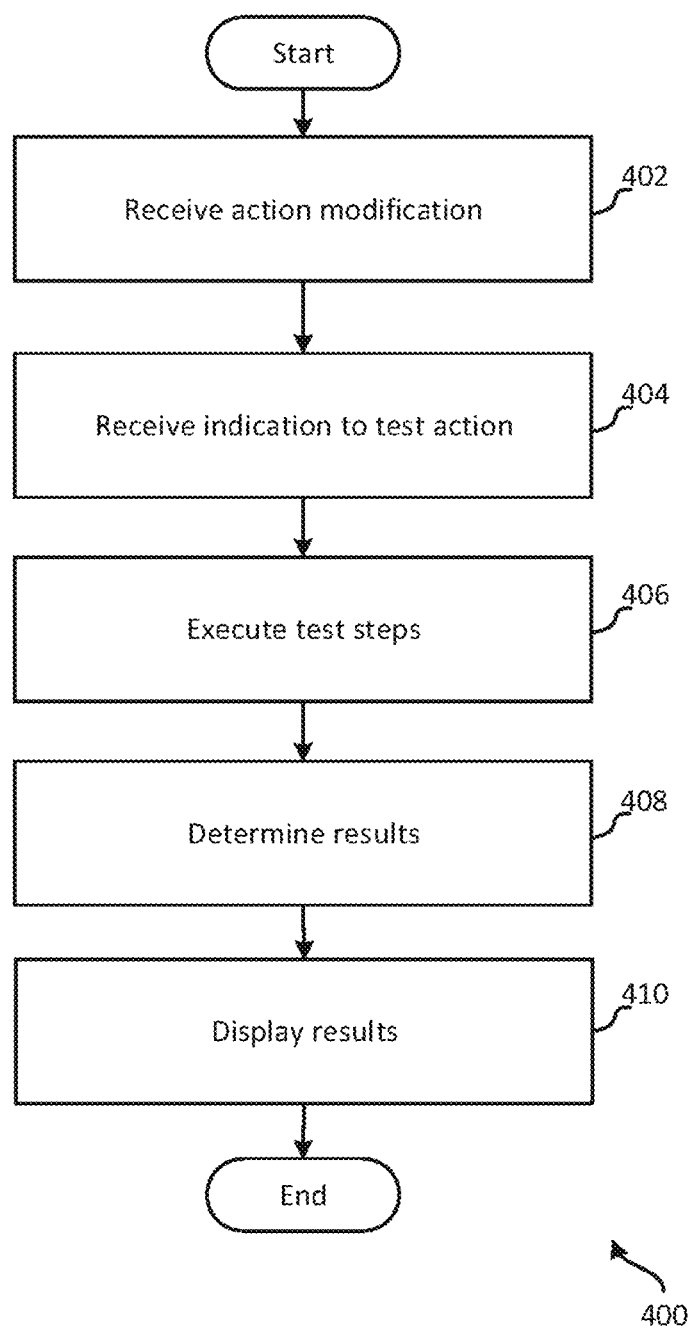
FIG. 4 illustrates an exemplary method for testing custom application software utilizing a no-code consumer platform in accordance with some embodiments of the present technology.

FIG. 4 illustrates an exemplary method 400 for testing custom application software utilizing a no-code consumer platform. The method begins at a start operation and flow continues to operation 402.

At operation 402 a no-code input that modifies a step associated with an application action is received. The no-code input may be received via an ERP test application user interface. In some examples, a user may select the step from a menu of pre-populated steps that can be modified in an ERP application. Examples of steps that may be selected include: create item, set values, and save, although other selectable steps may be provided depending on a specific action and/or test flow that a user is modifying. According to some examples, upon selecting the step that is to be modified, a user may provide an indication of where the step should be positioned within an action and/or a test flow that includes that step.

From operation 402 flow continues to operation 404 where a request to execute a test action corresponding to the application action is received. The request may be received via an ERP test application user interface. The test application may identify metadata chunks from one or more of a base metadata layer, a lifecycle metadata layer, and/or a tenant metadata layer, corresponding to each step in the action that is to be tested. In some examples, the test application may also identify expected results associated with modifying the step that was selected for modification.

From operation 404 flow continues to operation 406 where each of one or more steps for executing the test action in a test framework utilizing test metadata are executed. The test application may build a test action framework from existing metadata for the application, augmented by the new step modification, for executing each step in the test action framework. The test application may then execute each step for the step action.

From operation 406 flow continues to operation 408 where a determination is made as to whether an unexpected result occurred during the execution of the one or more steps. According to some examples, the test application may analyze an index that includes expected results associated with each step in the test action that is being tested. In other examples, the test application may analyze the metadata corresponding to each metadata chunk that is needed to execute the test action, and the metadata itself may contain an indication of what application elements are expected to be affected by the step modification, and in what manner those application elements are expected to be affected.

From operation 408 flow continues to operation 410 where, if an unexpected result is determined to have occurred during the execution of the one or more steps, a graphical representation of the unexpected result is caused to be displayed. In some examples, one or more of the executed steps may be highlighted to indicate to a testing user which steps resulted in unexpected results. In additional examples, the test application may generate a user interface corresponding to one or more application elements where the unexpected results occurred and highlight the area/portion of the user interface where there is an unexpected result.

From operation 410 flow continues to an end operation, and the method 400 ends.

Figure 5:
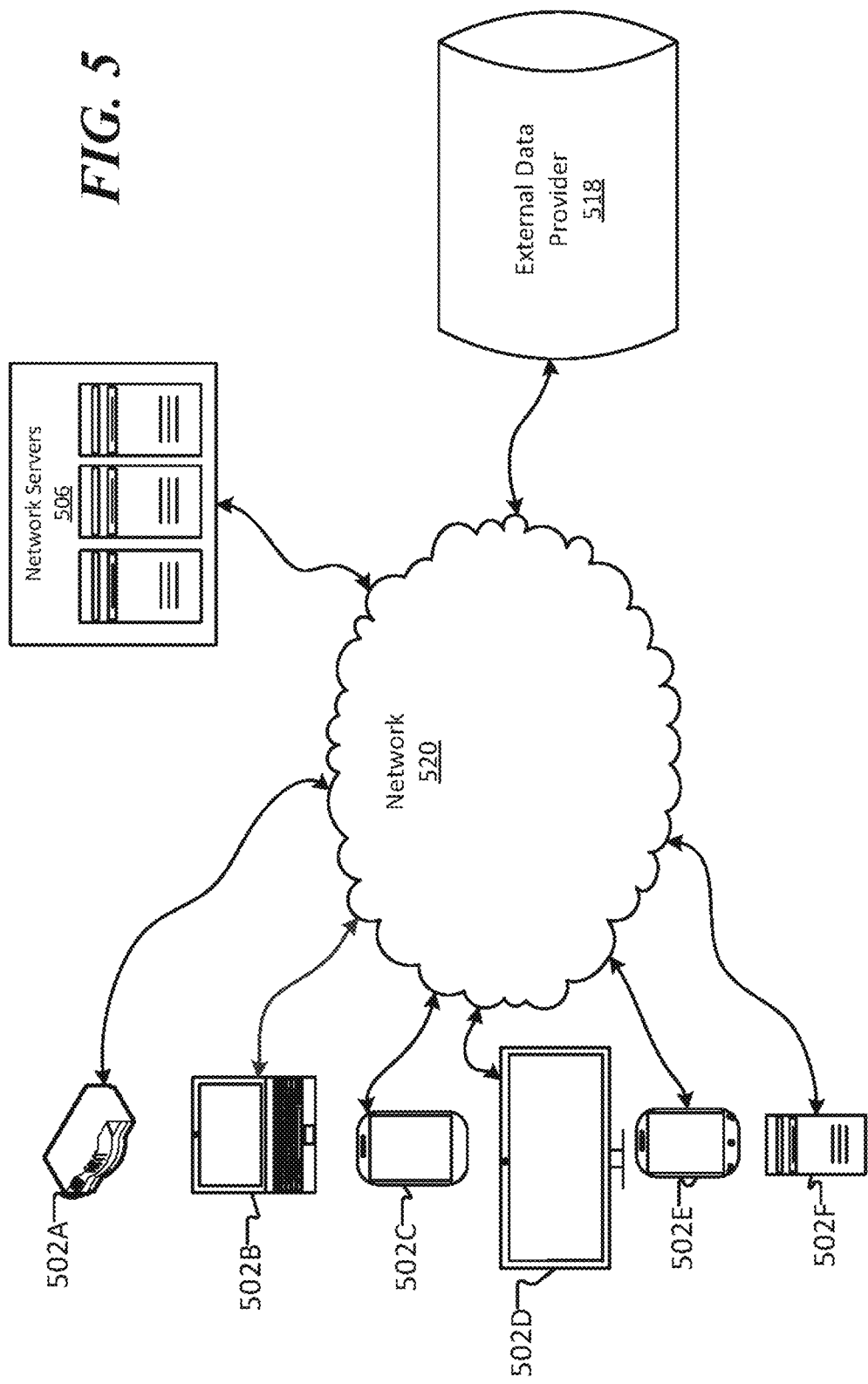
FIG. 5 is a simplified distributed computing network in which various aspects of the present disclosure may be practiced in accordance with some embodiments of the present technology.

FIG. 5 is a simplified diagram of a distributed computing system in which aspects of the present invention may be practiced. According to examples, any of computing devices 502A (a modem), 502B (a laptop computer), 502C (a tablet), 502D (a personal computer), 502E (a smart phone), and 502F (a server) may contain modules, components, engines, etc. for testing custom application software. Additionally, according to aspects discussed herein, any of computing devices 502A-F may contain necessary hardware for implementing aspects of the disclosure for testing custom application software as described herein. Any and all of the operations of the methods described herein for testing custom application software may be performed, by way of example, at network servers 506 and/or server 502F when computing devices 502A-F request or receive data from external data provider 518 by way of network 520. In examples, network servers 506 and/or server 502F may comprise one or more of a test application engine and/or one or more application modules and/or components for receiving an input that modifies an application action; receiving a request to execute a test action corresponding to the application action; identifying one or more steps for executing the test action; executing each of the one or more test steps in a test framework utilizing test metadata; determining whether an unexpected result occurred during the execution of the one or more steps; and causing, if an unexpected result is determined to have occurred, a graphical representation of the unexpected result to be displayed.

Figure 6:
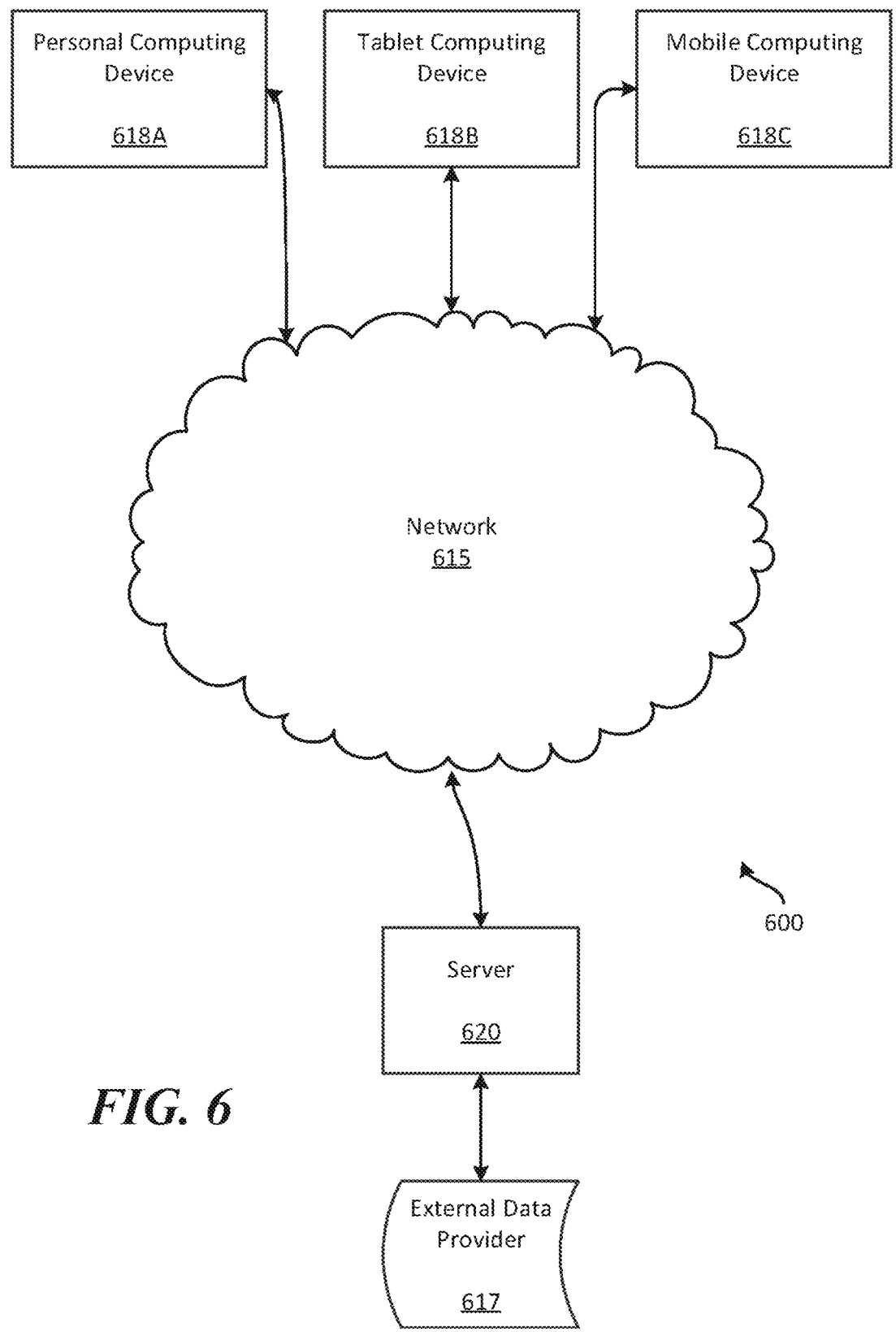
FIG. 6 is a simplified distributed computing network in which various aspects of the present disclosure may be practiced in accordance with some embodiments of the present technology.

Turning to FIG. 6, one embodiment of the architecture of a system for testing custom application software is provided. Content and/or data interacted with, requested, or edited in association with one or computing devices may be stored in different communication channels or other storage types. For example, data may be stored using a directory service, a web portal, a mailbox service, an instant messaging store, or a compiled networking service for managing, interacting with, and processing metadata layers corresponding to modified ERP application steps/actions. The system for testing custom application software and executing the operations associated with the methods described herein may use any of these types of systems or the like for enabling data utilization, as described herein. A computing device 618A, 618B, and/or 618C may provide a request to a cloud/network, which is then processed by a server 620 in communication with an external data provider 617. As one example, the external data provider 617 may provide a data stream in response to a processed request to test modifications to ERP applications over the web to the computing device 618A, 618B, and/or 618C through a network 615. By way of example, a client computing device may be implemented as any of the systems described herein, and embodied in a personal computing device, a tablet computing device, and/or a mobile computing device (e.g., a smart phone, a tablet, etc.), as shown with computing devices 618A, 618B, and 618C. Any of these aspects of the systems described herein may obtain content from the external data provider 617.

In various embodiments, the types of networks used for communication between the computing devices that makeup the present invention include, but are not limited to, an Internet, an intranet, wide area networks (WAN), local area networks (LAN), virtual private networks (VPN), global positioning system (GPS) devices, cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Operating environment 600 typically includes at least some form of computer readable media. Computer readable media can be any available media that can be accessed by a processor such as processing device 780 depicted in FIG. 7 and processor 802 shown in FIG. 8 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, read-only memory (ROM), electrically erasable programmable read-only memory, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. Combinations of the any of the above should also be included within the scope of computer readable media.

The operating environment 600 may be a single computer operating in a networked environment using logical connections to one or more remote computers. The one or more remote computers may comprise a personal computer, a server, a router, a network PC, a peer device or other common network node, and typically includes many or all of the elements described above as well as others not so mentioned. The logical connections may include any method supported by available communications media. Such networking environments are commonplace in enterprise-wide computer networks, intranets and the Internet.

Figure 7:
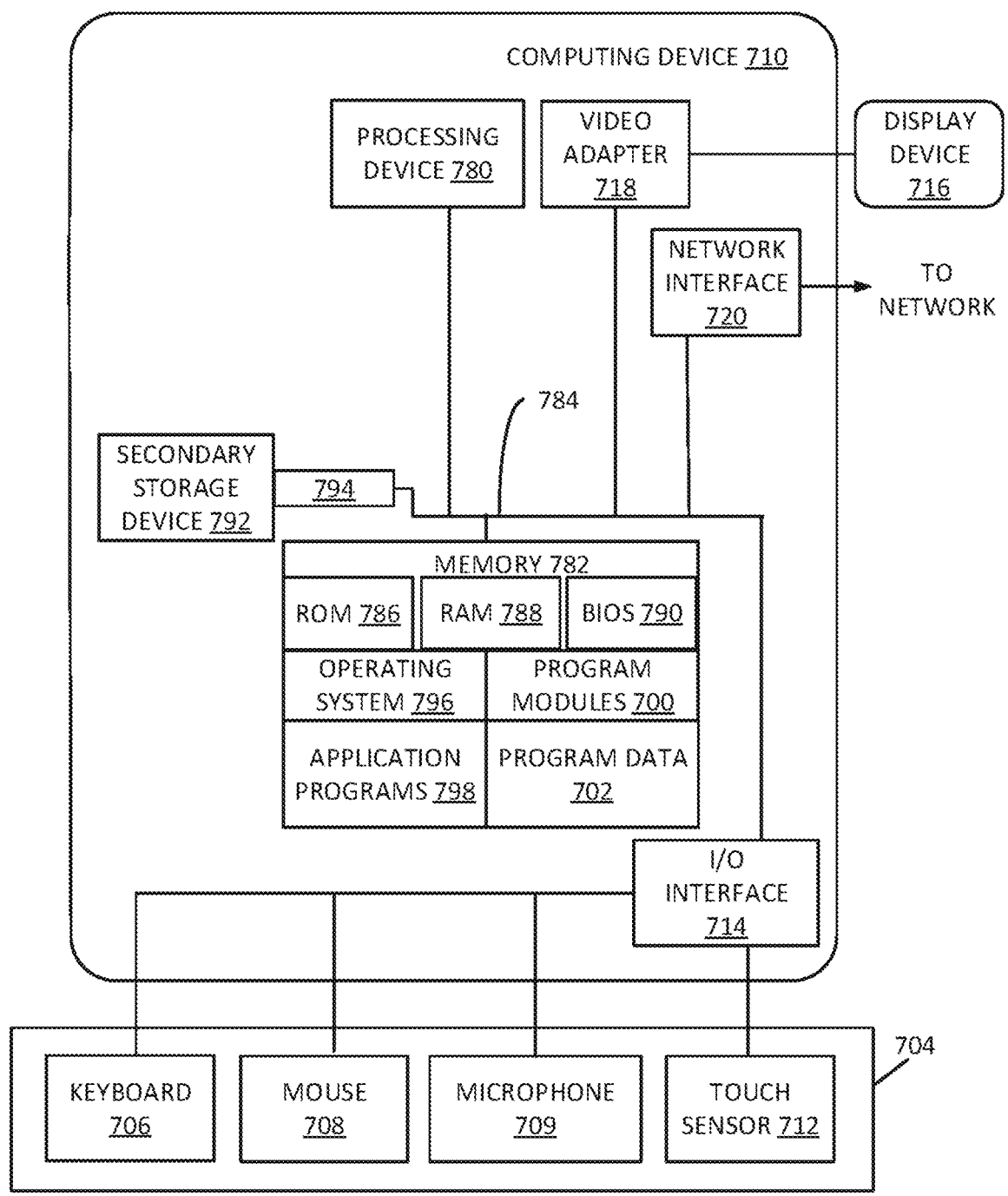
FIG. 7 is a block diagram illustrating example physical components of a computing device with which aspects of the disclosure may be practiced in accordance with some embodiments of the present technology.

FIG. 7 illustrates one aspect in which an exemplary architecture of a computing device 710 that can be used to implement one or more aspects of the present disclosure, including any of the plurality of computing devices described herein with reference to the various figures and their corresponding descriptions. The computing device 710 illustrated in FIG. 7 may be used to execute the operating system, application programs, and software modules (including the software engines) described herein. For example, with respect to FIG. 8 any of the program modules and engines 814 and corresponding operations, including auto-test creation engine 816, test metadata analysis engine 818, object effects engine 820, value effects engine 822, base metadata analysis engine 824, tenant metadata analysis engine 826, and/or lifecycle metadata analysis engine 828 may be executed utilizing the computing device 710 illustrated in FIG. 7. To avoid undue repetition, this description of the computing device will not be separately repeated herein for each of the other computing devices described with regard to the other figures, including computing devices 102A, 102B, and server computing device 118 (depicted in FIG. 1), computing device 302 (depicted in FIG. 3), computing devices 502A-F and network servers 506 (depicted in FIG. 5), computing devices 618A-618C and server 620 (depicted in FIG. 6), and computing device 800 (depicted in FIG. 8), but such devices can also be configured as illustrated and described with reference to FIG. 7.

The computing device 710 includes, in some embodiments, at least one processing device, such as a central processing unit (CPU). A variety of processing devices are available from a variety of manufacturers, for example, Intel, Advanced Micro Devices, and/or ARM microprocessors. In this example, the computing device 710 also includes a system memory 782, and a system bus 784 that couples various system components including the system memory 782 to the processing device 780. The system bus 784 is one of any number of types of bus structures including a memory bus, or memory controller; a peripheral bus; and a local bus using any of a variety of bus architectures.

Examples of computing devices suitable for the computing device 710 include a server computer, a desktop computer, a laptop computer, a tablet computer, a mobile computing device (such as a smart phone, a tablet, a mobile digital device, or other mobile devices), or other devices configured to process digital instructions.

The system memory 782 includes read only memory 786 and random access memory 788. A basic input/output system 790 containing the basic routines that act to transfer information within computing device 710, such as during start up, is typically stored in the read only memory 786.

The computing device 710 also includes a secondary storage device 792 in some embodiments, such as a hard disk drive, for storing digital data. The secondary storage device 792 is connected to the system bus 784 by a secondary storage interface 794. The secondary storage devices 792 and their associated computer readable media provide nonvolatile storage of computer readable instructions (including application programs and program modules), data structures, and other data for the computing device 710. Details regarding the secondary storage devices 792 and their associated computer readable media, as well as their associated nonvolatile storage of computer readable instructions (including application programs and program modules) will be more fully described below with reference to FIG. 8.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program modules and/or program engines can be stored in secondary storage device 792 or system memory 782, including an operating system 796, one or more application programs 798, other program modules 700 (such as the software engines described herein), and program data 702. The computing device 710 can utilize any suitable operating system, such as Linux, Microsoft Windows™, Google Chrome™, Apple OS, and any other operating system suitable for a computing device.

According to examples, a user provides inputs to the computing device 710 through one or more input devices 704. Examples of input devices 704 include a keyboard 706, mouse 708, microphone 709, and touch sensor 712 (such as a touchpad or touch sensitive display). Additional examples may include other input devices 704. The input devices are often connected to the processing device 780 through an input/output interface 714 that is coupled to the system bus 784. These input devices 704 can be connected by any number of input/output interfaces, such as a parallel port, serial port, game port, or a universal serial bus. Wireless communication between input devices and input/output interface 714 is possible as well, and includes infrared, BLUETOOTH® wireless technology, cellular and other radio frequency communication systems in some possible aspects.

In an exemplary aspect, a display device 716, such as a monitor, liquid crystal display device, projector, or touch sensitive display device, is also connected to the system bus 784 via an interface, such as a video adapter 718. In addition to the display device 716, the computing device 710 can include various other peripheral devices (not shown), such as speakers or a printer.

When used in a local area networking environment or a wide area networking environment (such as the Internet), the computing device 710 is typically connected to a network such as network 520 shown in FIG. 5 and network 615 shown in FIG. 6 through a network interface 720, such as an Ethernet interface. Other possible embodiments use other communication devices. For example, certain aspects of the computing device 710 may include a modem for communicating across a network.

The computing device 710 typically includes at least some form of computer readable media. Computer readable media includes any available media that can be accessed by the computing device 710. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 710. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices may be coupled together with a suitable data communication network so as to collectively perform the various functions, methods, or operations disclosed herein.

Figure 8:
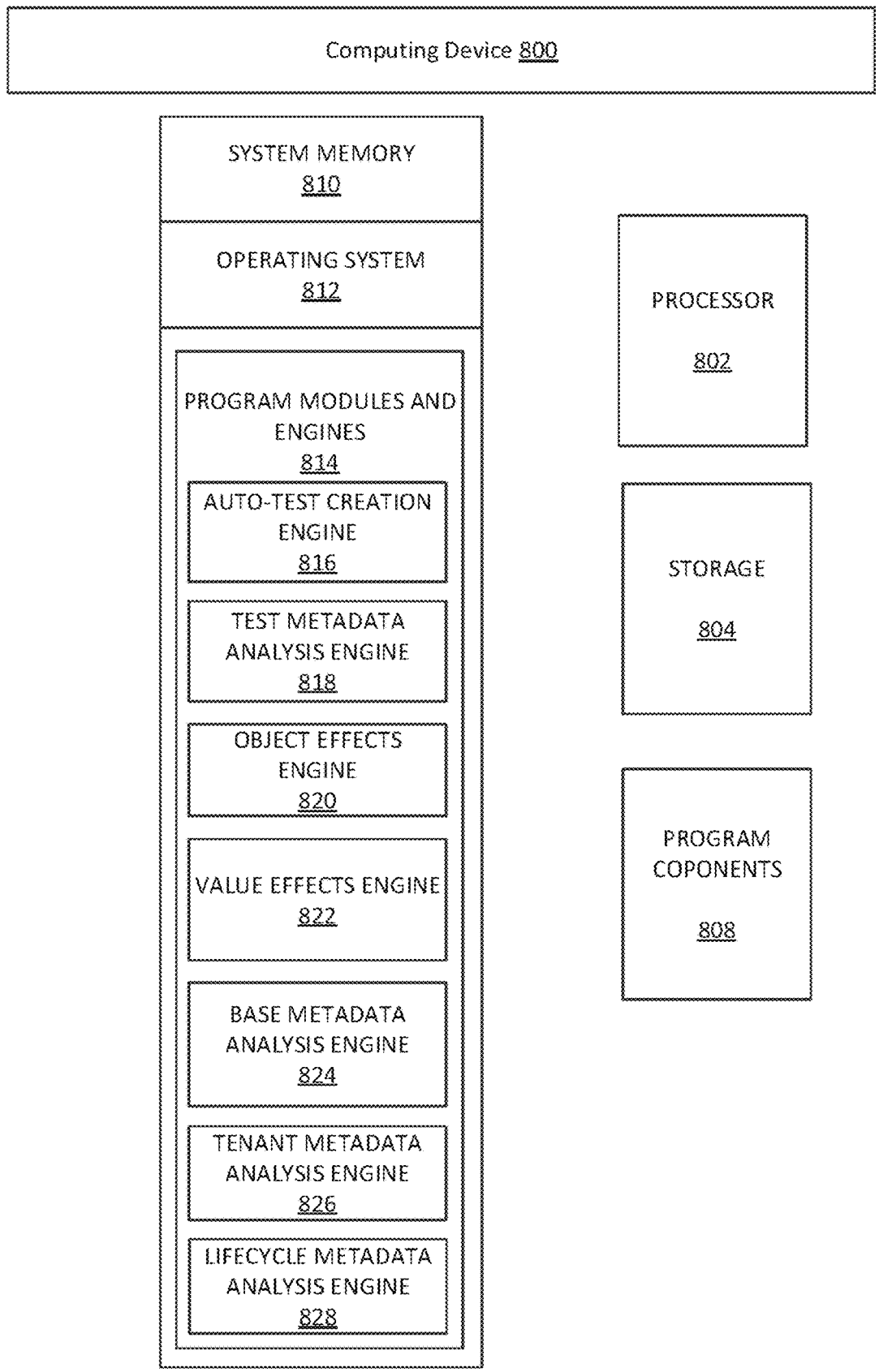
FIG. 8 is a block diagram illustrating physical components (e.g., hardware) of a computing device 800 with which aspects of the disclosure may be practiced in accordance with some embodiments of the present technology.

FIG. 8 is a block diagram illustrating additional physical components (e.g., hardware) of a computing device 800 with which certain aspects of the disclosure may be practiced. The computing device components described below may have computer executable instructions for receiving an input that modifies a step associated with an application action; receiving a request to execute a test action corresponding to the application action; identifying one or more test steps for executing the test action; executing each of the one or more test steps in a test framework utilizing test metadata; determining whether an unexpected result occurred during the execution of the one or more steps; and causing a graphical representation of the unexpected result to be displayed if an unexpected result is determined to have occurred.

Computing device 800 may perform the above-described functions alone or in combination with a distributed computing network such as those described with regard to FIGS. 5 and 6 which may be in operative contact with computing device 618A, 618B, and/or 618C, wherein computing devices 618A, 618B, and/or 618C may represent personal a computing device, a tablet computing device, and/or a mobile computing device which may communicate and process one or more of the program modules and/or program engines described in FIG. 8 including: auto-test creation engine 816, test metadata analysis engine 818, object effects engine 820, value effects engine 822, base metadata analysis engine 824, tenant metadata analysis engine 826, and/or lifecycle metadata analysis engine 828. According to additional examples, computing device 800 may be in communicative contact via the distributed computing networks described in FIGS. 5 and 6 and computing device 800 may comprise and describe any of computing devices 502A, 502B, 502C, 502D, 502E and 502F.

In a basic configuration, the computing device 800 may include at least one processor and system memory. Depending on the configuration and type of computing device, the system memory 810 may comprise, but is not limited to, volatile storage (e.g., random access memory), non-volatile storage (e.g., read-only memory), flash memory, or any combination of such memories. The system memory 810 may include an operating system 812 and one or more program modules and engines 814 suitable for testing custom application software, such as one or more components in regards to FIG. 8 and, in particular, auto-test creation engine 816, test metadata analysis engine 818, object effects engine 820, value effects engine 822, base metadata analysis engine 824, tenant metadata analysis engine 826, and/or lifecycle metadata analysis engine 828. The operating system 812, for example, may be suitable for controlling the operation of the computing device 800. Furthermore, aspects of the disclosure may be practiced in conjunction with a graphics library, other operating systems, or any other application program and is not limited to any particular application or system.

The computing device 800 may have additional features or functionality. For example, the computing device 800 may also include additional data storage device (removable and/or non-removable) such as, for example, magnetic disks, optical disks, or tape. Such additional storage is illustrated in FIG. 8 by storage 804. It will be well understood by those of skill in the art that storage may also occur via the distributed computing networks described in FIG. 5 and FIG. 6. For example, computing device 800 may communicate via network 520 in FIG. 5 and data may be stored within network servers 506 and transmitted back to computing device 800 via network 520 if it is determined that such stored data is necessary to execute one or more functions described herein. Additionally, computing device 800 may communicate via network 615 in FIG. 6 and data may be stored within server 620 and transmitted back to computing device 800 via network 615 if it is determined that such stored data is necessary to execute one or more functions described herein.

As stated above, a number of program modules and data files may be stored in the system memory 810. While executing the processor 802, the program modules and engines 814 (e.g., test metadata analysis engine 818) may perform processes including, but not limited to, the aspects described herein. Other program modules and engines may be used in accordance with aspects of the present disclosure.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing form the true spirit and scope of the following claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for testing custom application software, comprising:
   receiving an input comprising a modification to an existing action of an application, wherein the existing action comprises a set of steps that make up the existing action;
   receiving a request to execute a test action, wherein the test action incorporates the modification into the existing action of the application;
   identifying at least one metadata chunk corresponding to the modification;
   replicating the at least one metadata chunk corresponding to the modification to create test metadata, wherein the test metadata describes each object in the application that is expected to be affected by the modification;
   executing each of one or more test steps for executing the test action in a test framework utilizing the test metadata;
   determining whether an unexpected result occurred during the execution of the one or more test steps; and
   causing, if an unexpected result is determined to have occurred, a graphical representation of the unexpected result to be displayed.

2. The method of claim 1, further comprising:
   causing, if an unexpected result is determined not to have occurred, an indication of a good test to be displayed.

3. The method of claim 1, wherein the input comprising the modification to the existing action is a no-code input.

4. The method of claim 3, wherein the no-code input comprises a selection of a test step from a pre-populated test step selection menu.

5. The method of claim 1, wherein the modification to the existing action is a new step and the one or more test steps includes the new step.

6. The method of claim 5, further comprising receiving a selection indicating where to input the new step in the set of steps that make up the existing action.

7. The method of claim 1, wherein the test metadata describes each object in the application that is expected to be unaffected by the modification.

8. The method of claim 1, wherein the test metadata describes each value in the application that is expected to be affected by the modification.

9. The method of claim 8, wherein the test metadata describes how each value in the application that is expected to be affected by the modification is expected to be affected.

10. The method of claim 1, wherein the test metadata describes each value in the application that is expected to be unaffected by the modification.

11. The method of claim 1, wherein the graphical representation of the unexpected result comprises an application user interface generated from the test metadata corresponding to a user interface in the application where the unexpected result would occur.

12. The method of claim 1, wherein the test action comprises one or more of: a create action, an update action, a delete action, a search action, and a navigation action.

13. The method of claim 1, wherein each of the one or more test steps comprises one or more of: setting a value for a data item in the application, executing a form action in the application, executing a row action in the application, validating data in the application, obtaining a value from a data item in the application, and determining whether metadata for a user interface element exists for a data item in the application.

14. A system for testing custom application software, comprising:
   at least one processor; and
   a memory operatively connected to the at least one processor, the memory comprising computer-executable instructions that, when executed by the at least one processor, are operative to:
      receive an input comprising an addition to an existing action of an application, wherein the existing action comprises a set of steps that make up the existing action;
      receive a request to execute a test action, wherein the test action incorporates the addition into the existing action of the application;
      identify at least one metadata chunk corresponding to the addition;
      replicate the at least one metadata chunk corresponding to the addition to create test metadata, wherein the test metadata describes each object in the application that is expected to be affected by the addition;
      execute each of one or more test steps for executing the test action in a test framework utilizing the test metadata;
      determine whether an unexpected result occurred during the execution of the one or more steps; and
      cause, if an unexpected result is determined to have occurred, a graphical representation of the unexpected result to be displayed.

15. The system of claim 14, wherein the input comprising the addition to the existing action is a no-code input comprising a selection of a test step from a pre-populated test step selection menu.

16. The system of claim 14, wherein the test metadata describes each object in the application that is expected to be affected by the addition.

17. The system of claim 14, wherein the test metadata describes each value that is expected to be affected by the addition.

18. A computer-readable storage device comprising executable instructions that, when executed by one or more processors, assists with testing custom application software, the computer-readable storage device including instructions executable by the one or more processors for:
   receiving an input comprising a modification to an existing action of an application, wherein the existing action comprises a set of steps that make up the existing action;
   receiving a request to execute a test action, wherein the test action incorporates the modification into the existing action of the application;
   identifying at least one metadata chunk corresponding to the modification;
   replicating the at least one metadata chunk corresponding to the modification to create test metadata, wherein the test metadata describes each object in the application that is expected to be affected by the modification;
   executing each of one or more test steps for executing the test action in a test framework utilizing the test metadata;
   determining whether an unexpected result occurred during the execution of the one or more test steps; and
   causing, if an unexpected result is determined to have occurred, a graphical representation of the unexpected result to be displayed.

19. The computer-readable storage device of claim 18, wherein the input comprising the modification to the existing action is a no-code input comprising a selection of a test step from a pre-populated test step selection menu.

20. The computer-readable storage device of claim 18, wherein the test metadata describes each value and each object in the application that is expected to be affected by the modification.

* * * * *